5 3,205,091
PROCESS FOR MAKING REMOISTENABLE
GUMMED SURFACES
Robert H. Williams, New Brunswick, N.J., and William Lewis Foote, New York, N.Y., assignors to National Starch and Chemical Corporation, New York, N.Y., a corporation of Delaware
Filed Apr. 25, 1962, Ser. No. 194,210
8 Claims. (Cl. 117—122)

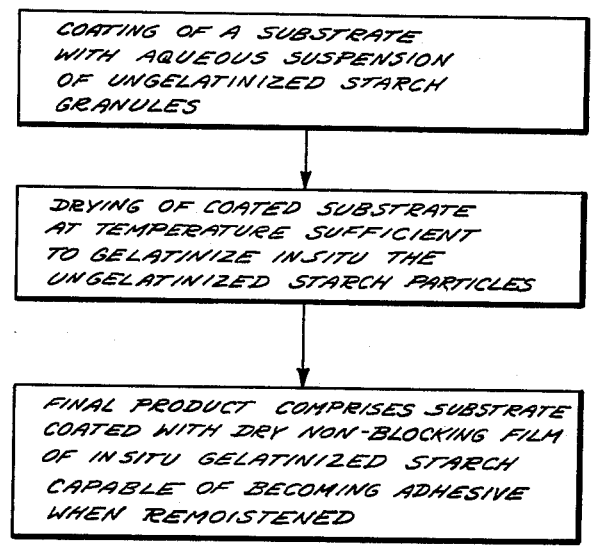

This application is a continuation-in-part of application Serial No. 103,971, filed April 19, 1961, now abandoned.

This invention relates to a method for making gummed surfaces. We refer herein to the type of gummed surfaces which are activated to an adhesive state by remoistening with water.

The prime object of our invention is to apply upon a suitable substrate or web, such for example as paper, an adhesive layer or coating which will not block (i.e., stick to other surfaces) when dry, but which, when remoistened, is capable of producing a tack of bonding value of at least about 50 McLaurin units. The definition and significance of this latter measurement will be explained subsequently.

It is our further object to provide for a gummed tape which may, if desired, be manufactured on conventional equipment, commonly in use in the gummed tape industry.

Although we shall speak herein mainly of gummed tape, we use the term "tape" to encompass gummed adhesive sheets of any width, whether these be cut in strips, label forms, or any other shape. It will be obvious that the concept of our invention relates to the making of gummed remoistenable adhesive sheets generally, rather than to tape in the narrow sense of the word. Similarly, while we shall illustrate our invention mainly with regard to an adhesive composition coated upon paper, it will be evident that the adhesive can just as well be coated upon any other backing, depending entirely upon the use to which the finished product is to be put. Thus, the adhesive composition may be coated upon textile fabrics, plastic films, or any other desired body. The surface upon which the adhesive is coated will herein be referred to, for convenience, as a "web" or "substrate."

We have discovered that a notably improved tape is produced, by applying to a substrate a wet film formed from an aqueous suspension of uncooked (i.e. ungelatinized) granules of starch, the suspension having a latent viscosity of at least 5,000 centipoises, and containing certain additives, and subsequently gelatinizing the granules "in situ" so as to form a smooth, glossy, adhesive coating. This coating, although non-blocking when dry, may be remoistened with water to form a powerfully adhesive surface, capable of being securely bonded to other objects by mere manual pressure.

"Latent viscosity," or inherent viscosity, as contemplated in this invention, may be defined as being that viscosity which would result from the gelatinization of the starch granules in a given aqueous suspension or slurry of such granules. The viscosity is measured by heating the aqueous slurry for about 15 minutes at about 190° F., cooling to 130° F., and measuring the viscosity in a Brookfield viscometer.

The McLaurin test is a standard remoistening and bonding test employed in the gummed tape industry, for determining the adhesive power of water or solvent activatable gummed tapes. In the test procedure a four-inch strip of the gummed tape is activated (under standard conditions) and applied to kraft paper. The McLaurin values are a measure of the tensile force required to separate the tape from the kraft paper, and may range from 0 to 100 units. The test is described in Test Method T463M–52 of the Technical Association of the Pulp and Paper Industry.

By gelatinizing "in situ" we refer to the fact that in the process of our invention the starch is not first cooked (i.e. gelatinized) in water and then spread on the paper, but rather it is spread on the paper while still in the ungelatinized granule form, and only then, when already in the form of a film on the paper, is the starch gelatinized. This is a critical distinction.

Starch has previously been gelatinized in situ, but for an unrelated purpose and process. We refer to the well known method of making corrugated paper wherein the adhesive consists of ungelatinized starch suspended in a carrier medium comprising an aqueous dispersion of cooked starch. The liquid adhesive is placed between the two paper surfaces to be adhered, and heat is applied at the point where bonding is to take place. The heat gelatinizes the ungelatinized starch, causing the adhesive to thicken and results in an instantaneous bonding of the paper surfaces. In other words, the starch is gelatinized at the moment that adhesion between two surfaces is to take place, and indeed the gelatinization is what brings about the adhesion.

On the other hand, in our process of making gummed tape, the gelatinization of the starch upon the surface of the tape is not accompanied by adhesion to any other surface. The starch within the film is gelatinized, the film dried, and one has a dry-non-tacky surface. It is only later, when it is desired to apply the gummed tape to some other object, that one moistens the dry film, causing it to become tacky and powerfully adhesive. No heating is involved, at the moment of adhesion.

It has in the past been known to use starch as the base for tape adhesives. When gelatinized by cooking in water, starches form pastes which form good films, having excellent adhesive qualities. However, the use of cooked starch pastes, from which to cast films on tape, is attended by several disadvantages. Firstly, the viscosity of raw starch paste increases rapidly as the solids content of the starch increases. Thus, a paste prepared from as little as 15% by weight of raw starch has a viscosity so high that it cannot be handled by the coating equipment employed in the gummed tape industry. In other words, the amount of starch solids that can be applied to tape by this method is necessarily very low. Secondly, the viscosity of a group of starch pastes, all having the same starch solids, may vary significantly, being affected by the rate at which the slurry had been heated to form the paste, and the maximum temperature attained during heating. Thirdly, slight changes in the concentration of starch will significantly alter its pasting characteristics. The characterists of the starch paste are subject to alteration by mechanical stresses such as pressure, shearing action and the like, of the type encountered, for example, in the pumping of pastes from one part of a plant to another, in the industrial tape-making process. All of these variables have made the preparation of uniform gummed tape, from a starch base, difficult if not impossible.

In order to obtain pastes having higher solids contents, it has been attempted to use partially or substantially degraded starches (dispersing these in water as by cooking, before application to the substrate). However, degraded starch products, such for example as dextrines and sugars, have necessarily suffered a reduction in the size of their molecules, as compared to the original starch molecules, and this in turn involves a reduction in the bonding strength of the resultant adhesive film. Also, when degradation products such as dextrines are employed as the base for gummed tape adhesives, the danger of blocking is increased (that is, the danger that the dry adhesive film will stick to other surfaces before it is activated by remoistening).

We have found that by forming aqueous slurries of ungelatinized starch granules, applying them as a wet coat to web materials such as paper, fabrics and the like, and thereafter gelatinizing them "in situ," it is possible to prepare gummed tapes or other gummed surfaces in a remarkably efficient and simple manner.

The accompanying drawing is a flow sheet of the essential steps of our process and of the final product obtained therewith.

We have further found that in order for the ultimate dry gummed surface to have the required remoistening properties, and other advantageous qualities which will be discussed subsequently, the starch slurry should also contain an ingredient which acts as a peptizer or humectant for the starch. "Peptizer" is a term widely used in the starch art to denote any agent which has a swelling or dispersing effect upon starch. Some peptizers, such as urea or the thiocyanates, have such a strong solubilizing effect upon starch that they will, if used in sufficient amount, actually gelatinize starch suspended in water, without heating. Others, such as calcium chloride, sodium chloride and the like, may not be powerful enough peptizers to gelatinize starch by themselves, but they do tend to thin and stabilize the aqueous starch suspensions, and to retard retrogradation or insolubilization of the starch after the latter has been gelatinized.

We have found that when a peptizer or humectant is present in our slurry of ungelatinized starch in water, before the latter is coated onto paper or other supporting web, the ultimate dry gummed surface becomes tacky and powerfully adhesive upon being remoistened with water.

Representative examples of suitable peptizers include the water soluble amides, such as urea, ethylene urea, propylene urea, formamide and dicyandiamide; also the thiocyanates, such as ammonium thiocyanate; also the alkali metal and alkaline earth hydroxides; also the water-soluble inorganic chlorides and nitrates, such for example as sodium chloride, calcium chloride, aluminum chloride, zinc chloride, zinc nitrate, magnesium chloride, copper chloride, manganese nitrate and the like. Other known peptizers for starch include formic acid and chloral.

In place of the peptizer, or in addition thereto, we can use a humectant. There are many substances which are known to have a softening or plasticizing effect upon starch films, largely because of their hygroscopic properties. These are often referred to as humectants, and are best represented by the polyols, such as sugar, sorbitol, glycerine, and the alkylene glycols. The presence of a humectant, in place of or in combination with a peptizer, improves the remoistening properties of the gummed surfaces of our invention. The amount of peptizer or humectant (or the total of both, if a combination of peptizer and humectant is employed) should be between 5% and 100%, based on the dry weight of the starch in the composition. In this connection, however, it should be remembered that certain peptizers, as previously explained, are such powerful dispersing or solubilizing agents for starch that they can gelatinize starch in the absence of heat. It is, of course, quite important that the ungelatinized starch in the starch-water slurry shall not be gelatinized prior to its application to the paper or other web. Therefore, the amount of peptizer in the slurry should be below that amount which will gelatinize the starch. This upper limit will vary with different peptizers; therefore, while 100% based on the starch weight is a general upper limit, this figure may be lower for a given peptizer.

The presence of the peptizer or humectant in the slurry of ungelatinized starch in water accomplishes several purposes, including the following:

(a) The finished dry gummed surface becomes adhesive and tacky upon remoistening.

(b) The gummed surface, upon being remoistened, retains its tacky state for a long period, thus permitting better and more permanent bonding to other surfaces.

(c) The dry gummed paper or other gummed web has a reduced tendency to warp or curl.

(d) There is less tendency to lose remoistening properties upon aging. Adhesive films made from starches containing relatively high proportions of amylose tend to become insoluble and non-remoistenable upon storage. However, the presence of the peptizers or humectants, in the amounts shown, vastly improves the aging properties.

(e) The additives tend to reduce the gelatinization temperature of the starch, and one may therefore employ lower temperatures in order to gelatinize the starch "in situ" after the starch slurry has been coated onto the web. The economic advantages are self-evident.

The gummed surfaces produced by our process are smooth, glossy, and possess surprisingly high tackiness when remoistened, as well as excellent bonding strength. No significant amount of blocking is encountered.

In general terms the process of our invention may be described as follows:

(1) Prepare an aqueous slurry ungelatinized starch granules, the slurry to contain at least 30% by weight of starch (dry basis). The pH of the slurry should be at least 4, and may be as high as desired, so long as the pH is not so high as to bring about gelatinization of the starch prior to its application to the web.

(2) Dissolve in the above-mentioned slurry, either before or after addition of the starch, from 5% to 100% of a peptizer or humectant (or a combination of the two), based on the dry weight of the starch.

(3) Apply the aqueous slurry to the web (e.g. paper, etc.

(4) Dry the wet coat, which is now on the web, in such a manner that the starch granules are gelatinized. In practice, of course, this involves the application of heat, as will be explained subsequently.

Thereafter, the dry, gummed web is wound, formed into sheets or otherwise prepared for storage or for converting into the particular shapes and sizes desired.

*Preparation of the slurry*

The starch is mixed with the water, using any suitable agitating device conventional in the preparation of starch slurries. The starch solids in the slurry should be of the order of about 30% to 55%, by weight. Also, as previously noted, the slurry must have a latent viscosity of at least 5,000 cps., meaning that the type and amount of starch must be such that when a sample of the slurry is heated at 190° F., cooled to 130° F. and measured in a Brookfield viscometer, it will have a viscosity of at least 5,000 cps. As the starch to be employed, we prefer ungelatinized granules of sago, potato, waxy maize or tapioca starches. The grain starches such as corn, while not inoperable, are sometimes less desirable. It is an advantage of these slurries that in spite of their relatively high solids content, they are characterized by low viscosity, making possible their application to the web by conventional coating equipment. This low viscosity is, of course, due to the fact that the granules have not been gelatinized.

For some types of gummed tapes, in which excellent remoistening properties are of primary importance, even to the extent of some reduction in ultimate bonding strength, it is within the scope of our invention to employ starches which, although still in ungelatinized granule form, have been chemically or otherwise modified, as for example by esterification, etherification, oxidation or partial hydrolysis. Means for introducing specifically desired properties into starch by chemical substitution are well known in the art. Such modified starches may also be used in the starch slurry in combination with raw, unmodified starch, but in no case should the latent viscosity of the slurry be below about 5,000 cps.

The above-mentioned starch slurry should contain from 5% to 100%, based on the dry weight of the starch, of a peptizer or humectant (as previously described).

*Application of the aqueous slurry to the web material*

The starch slurry may be applied to the web material by any of the usual coating methods conventional to the gummed tape industry. Examples of available, well known coating machines are the roll coaters, reverse-roll coaters, direct roll with a wire-wound smoothing bar, brush coaters, off-set gravure roll coaters and the like. It is obvious that certain types of coaters require somewhat different flow properties in the slurry than in the case of other coating machines. Thus, for example, where the coating is to be done with a doctor blade or certain types of roll coaters in which the coating material is subjected to high-shear conditions, it is within the scope of our invention to add a lubricating agent to the slurry which will reduce the frictional force between the ungelatinized starch granules. The selection of a suitable lubricant will offer no difficutly to those skilled in the art. Thus, a minor proportion of the starch granules may be solubilized (i.e. gelatinized) as by pre-cooking or chemical treatment, in order to obtain the required flow characteristics for proper coating. A modification of the flow characteristics may also be obtained by the addition to the slurry of a small quantity of natural gums, such as mannogalactan, guar gum, targacanth, locust bean gum, alginates, cellulose derivatives and the like. The amount and nature of the lubricant to be added will be determined by the particular type of coating equipment being employed, and the flow characteristics desired. When a pre-cooked unmodified starch is used as the lubricant, preferably no more than 25–30% of the starch in the slurry should be in the pre-cooked (gelatinized) form; when a pre-cooked modified starch is used as the lubricant, the pre-cooked portion may be somewhat greater, namely about 20% to 45%. In any case, the critical factor in the process is the presence of the ungelatinized starch in the slurry, which will be subsequently gelatinized on the web "in situ." Another important factor is the presence of the peptizer or humectant.

It may also be added that our process makes possible the presence in the adhesive composition of borax or metaborates, which are very valuable additives in order to achieve increased adhesive tackiness and "bite" when the final dry gummed surface is remoistened. In the processes of the prior art, where starch was first cooked into a paste and then applied to paper, the addition of borax to the cooked starch was not feasible, since borax vastly increases the viscosity of a starch paste, and its presence in a paste having any useful degree of starch solids would result in a paste consistency that would make application to paper quite impractical. On the other hand, since the starch in our slurry is mainly in the granular, ungelatinized state, the presence of the borax or metaborate does not unduly affect the viscosity of the slurry, and these chemicals can thus be conveniently introduced into the coating.

The slurry should preferably be dopsited on the web material in an amount to provide a wet coat of about 0.5 to 1 mil thickness, which when dry will provide a dry weight of the adhesive of between 5 and 25 pounds per ream of 3,000 square feet of the coated web. The preferred weight is 8 to 18 pounds.

*Gelatinizing the starch granules in situ on the web material*

This may be considered the most critical step in our process, since it is essential that substantially all of the starch granules in the coating be gelatinized "in situ" during the drying operation. This drying of the wet coating may be carried out on any suitable drying equipment, such as for example as by passing the coated web over hot rolls, or between hot surfaces such as steam coils, infrared heaters or the like. Whatever the drying method employed, the temperature of the wet, adhesive film during the drying must reach a point high enough to permit the starch granules to absorb water from the aqueous phase of the slurry and to gelatinize in situ. The resulting dried film is characterized by high gloss, good remoistening and bonding properties, good tack, and substantial absence of blocking.

It may be added that when drying the coated web over heated rolls, one can position the coated web so that the web material comes in contact with the roll (the adhesive coat being on the side away from the roll), or one can have the adhesive coat itself come in contact with the heated roll. The latter method is found desirable where very high gloss is sought in the final gummed surface.

Since the gelatinization temperature of most unmodified starches is of the order of 135° F. to 165° F., it is obvious that at least this minimum temperature must be attained during the drying of the wet coating. If the temperature is too low, the resultant dry film may be cloudy or opaque. On the other hand, if the temperature is too high, the resultant film may blister and be rough and discontinuous, due to the too rapid expansion of the evaporating water. In general, the temperature should not exceed about 190° F., and we prefer a range of 160° F. to 180° F.

Fortunately, the attainment of complete gelatinization within the coating is easily and simply detectable. When the starch granules are completely gelatinized, the resulting dry adhesive film has a clear, glossy appearance, and is characterized by high McLaurin test values, which in turn is indicative of good remoistening and bonding properties, and high tackiness upon remoistening. As already stated, incomplete gelatinization is evidenced by a chalky or opaque appearance, and the practitioner may readily take the necessary corrective measures, such as increasing the drying temperature.

Similarly, production rates may be improved by preheating the web, to which the wet coating is applied, to about ten degrees below the gelatinization temperature of the starch granules in the slurry. The slurry itself may also be preheated below the gelatinization temperature.

While all of the reasons for the superiority of the tapes made by our invention may not be understood, it is believed that one important factor is that gelatinization of the starch granules "in situ," on the tape, reduces to a minimum the possibility of degradation of the large starch molecules, thereby causing them to retain their maximum adhesive properties.

The embodiment of this invention will be further illustrated by the following examples. All parts are by weight, unless otherwise specified. Viscosities were determined on a Brookfield Viscometer (Model RBF, 20 r.p.m.) at 130° F., which is standard in the industry. McLaurin Units, as previously noted, are indicative of the bonding strength of the adhesive film. Indirectly, of course, a good McLaurin value also indicates good remoistening properties in the dry adhesive film, since a good bond can hardly be attained unless the dry film is first capable of being brought to a tacky, adhesive state by application of moisture.

EXAMPLE I

This example illustrates the procedure for determining the latent viscosity of an aqueous slurry of ungelatinized starch granules.

Thirty parts of unmodified, waxy maize starch granules were mixed with 70 parts of water to produce a 30% slurry. The viscosity at this point was about 800 centipoises.

The slurry was then gradually heated to 190° F., over a period of five minutes, and held at that temperature for about 15 minutes. During this heating period the starch granules were gelatinized. The starch paste was then cooled to 130° F., and the viscosity again determined. At this point the viscosity was found to be about 70,000 cps. Thus, the latent viscosity of a 30% slurry of unmodified, ungelatinized, waxy maize starch was shown to be about 70,000 cps.

EXAMPLE II (A) 350 parts of oxidized corn starch (ungelatinized) and 52.5 parts urea were slurried into 650 parts water and agitated until the slurry was uniform. This composition contained 33% starch, by weight, and had a latent viscosity greater than 5,000 cps. A portion of the aqueous slurry was deposited on pieces of standard gumming paper, to give a wet film thickness of about 1 mil, after which the coated paper was dried at a wet-film temperature of about 180° F. to 190° F. The starch was gelatinized completely during this drying step, as indicated by the clear, glossy film that resulted. The weight of the dry film was 6.1 lbs. per ream of 3,000 square feet.

(B) A second portion of the above slurry was deposited on pieces of standard gumming paper and dried-gelatinized in the same manner as above. However, the amount of slurry deposited was such as to give a dried film weight of 4.74 lbs. per ream of 3,000 square feet.

Standard remoistening and bonding tests were then made on the coated papers, using Test Method T463M–52 (McLaurin) of the Technical Association of the Pulp and Paper Industry (TAPPI). The following McLaurin values were obtained:

| Sample | Lbs. adhesive/ream (dry wt.) | McLaurin |
|---|---|---|
| A | 6.1 | 89 |
| B | 4.74 | 79.3 |

These high McLaurin values are indicative of the excellent remoistening, high-tack and bonding power of the adhesive films.

EXAMPLE III 120 parts of ungelatinized waxy maize starch were slurried into 170 parts water which contained 15 parts urea as a peptizing agent. The slurry was agitated until uniform mixture was obtained. This composition contained 39.4% raw starch by weight, and had a latent viscosity greater than 5,000 cps. The actual viscosity of the ungelatinized slurry was 3,760 cps.

A wet film of the above slurry of ungelatinized starch granules was deposited on a piece of standard gumming paper, to give a wet-film thickness of about 1 mil, after which the coated paper was dried at a wet-film temperature of about 160° F.–170° F. The raw starch was completely gelatinized during the drying step, as indicated by the clear, glossy film. The weight of the dried adhesive film was 13.95 lbs./ream of 3,000 square feet.

When the standard remoistening and bonding test was performed (as described in Example II) a McLaurin value of 84.1 was obtained.

The above example was repeated, except that in place of the ungelatinized waxy maize starch we used ungelatinized tapioca starch in one instance, ungelatinized potato starch in another, and ungelatinized sago starch in another. In each case comparable results were obtained, and the product made by gelatinizing the starch "in situ," on the paper, was invariably superior to the corresponding product made by first gelatinizing the starch in water and then applying the paste to the web.

EXAMPLE IV

This example illustrates the use, in the starch slurry, of minor amounts of cooked (i.e. gelatinized) starch, or sodium alginate, to act as a lubricant for the ungelatinized starch granules. Such lubricant is always present in a minor proportion with reference to the ungelatinized starch, which is in major proportion.

In each of the following compositions, the amount of starch or gum to be precooked was added to the water, which also contained dissolved therein the peptizing agent (as well as 2 parts by weight of sodium orthophenylphenate as preservative). The slurry was then heated, with agitation, to about 190° F. and held at this temperature for about 15 minutes. The composition, with its dispersion of cooked starch or gum, was then cooled to about 140° F., or at least 10° F. lower than the gelatinization temperature of the raw, ungelatinized starch which was subsequently to be added. When the composition was thus cooled, we added the ungelatinized starch (waxy maize starch in the case of these particular examples) and continued stirring until a uniform blend was obtained. In all cases the slurry thus prepared had a latent viscosity of at least 5,000 c.p.s.

The compositions were then coated on standard gumming paper, and the coated paper dried at a temperature sufficient to gelatinize the ungelatinized starch granules in the coating composition. The dry, coated papers were then tested as in Example II. The results are listed in the following table (quantities shown are parts by weight, unless otherwise indicated):

| Sample | Water | Peptizer* | Raw starch | Percent raw on total starch | Cooked | | Vis., cps./130° F. | Lbs./ream (dry) | McLaurin units |
|---|---|---|---|---|---|---|---|---|---|
| | | | | | Starch | Sodium alginate | | | |
| 4-a | 170 | 15(U) | 120 | 100 | | | 3,760 | 13.95 | 84.1 |
| 4-b | 172 | 15(U) | 120 | 99 | 2.5 | | 3,760 | 13.7 | 91.0 |
| 4-c | 176 | 15(U) | 120 | 96 | 5.0 | | 4,140 | 15.72 | 95.0 |
| 4-d | 215 | 15(U) | 120 | 94 | 7.5 | | 2,760 | 14.85 | 99.6 |
| 4-e | 216 | 15(U) | 120 | 92 | 10.0 | | 2,700 | 10.4 | 90.7 |
| 4-f | 170 | 30(N) | 119 | 92 | 10.0 | | 3,280 | 15.7 | 100 |
| 4-g | 170 | 15(N) | 105 | 91 | 10.0 | | 2,900 | 11.9 | 83.0 |
| 4-h | 170 | 20(N) | 108 | 91 | 10.0 | | 2,880 | 14.9 | 82.0 |
| 4-i | 170 | 15(U) | 90 | 90 | 10.0 | | 3,340 | 16.6 | 94.4 |
| 4-j | 170 | 15(U) | 68 | 85 | 12.5 | | 3,240 | 10.75 | 85.0 |
| 4-k | 151 | 15(U) | 66 | 81 | 15.0 | | 3,920 | 9.12 | 88.7 |
| 4-l | 150 | 15(U) | 62 | 78 | 17.5 | | 4,240 | 13.9 | 99.0 |
| 4-m | 150 | 15(U) | 57 | 74 | 20.0 | | 4,180 | 12.35 | 93.4 |
| 4-n | 160 | 15(U) | 50 | 69 | 22.5 | | 4,080 | 13.3 | 91.0 |
| 4-o | 150 | 15(U) | 25 | 55 | 20.0 | | 3,050 | 10.56 | 56.0 |
| 4-p | 260 | 13(U) | 120 | 100 | | 7 | 3,670 | 15.89 | 89.2 |
| 4-q | 200 | {13(U) / 30(C)} | 120 | 93 | 9.0 | | 2,100 | 9.9 | 100 |
| 4-r | 170 | {6(N) / 1.5(H)} | 120 | 100 | | | 3,200 | 12.5 | 86 |
| 4-s | 170 | 120(N) | 120 | 100 | | | 2,850 | 15.3 | 75.2 |
| 4-t | 170 | 60(S) | 120 | 92 | 10 | | 3,100 | 16.1 | 82 |
| 4-u | 170 | 30(G) | 120 | 92 | 10 | | 2,950 | 12.7 | 87 |
| 4-v | 170 | 30(B) | 120 | 92 | 10 | | 2,620 | 17.4 | 81 |
| 4-w | 170 | 10(D) | 120 | 92 | 10 | | 3,730 | 13.8 | 89 |
| 4-x | 170 | 30(A) | 120 | 92 | 10 | | 3,450 | 11.8 | 84 |

*In the "Peptizer" column, we have included peptizers and humectants, for purposes of brevity. The code letter after each quantity in that column denotes the particular chemical, as follows: (U)=urea; (N)=sodium nitrate; (C)=calcium chloride; (S)=cane sugar; (G)=glycerine; (B)=sorbitol; (D)=dicyandiamide; (A)=ammonium thiocyanate; (H)=sodium hydroxide.

In every one of the above examples, the dried film was characterized by excellent remoistenability, strong adhesion and high gloss.

EXAMPLE V

This example illustrates the use of sodium metaborate in the ungelatinized starch slurry, as well as a minor proportion of cooked starch as a lubricant. 120 parts of ungelatinized tapioca starch were mixed with 170 parts of water which contained 3 parts of cooked (gelatinized) tapioca starch, 15 parts of sodium nitrate and 3 parts of sodium metaborate. The slurry was agitated until a uniform mixture was obtained. The slurry had a latent viscosity greater than 5,000 centipoises, and the actual viscosity of the ungelatinized slurry was 3050 c.p.s. A wet film of the slurry was deposited on a strip of pre-sized textile fabric, after which the coated fabric was dried at a wet-film temperature of about 160°–170° F. The raw starch was completely gelatinized during the drying step, as indicated by the clear, glossy film. The weight of the dried adhesive film was 12.2 lbs. per ream of 3,000 square feet. Upon remoistening, the adhesive film was found to have a McLaurin value of 91.

Variations in materials, proportions and precedures will be apparent to the practitioner in the art, without departing from the scope of the invention, which is limited only by the following claims.

We claim:

1. A method for making gummed surfaces which may be activated to a tacky, adhesive state upon being remoistened with water, which comprises coating upon a paper substrate an aqueous suspension of ungelatinized starch particles, said suspension containing at least 30% by weight of starch, dry basis, and having a pH of at least 4, and then drying the coating, unaccompanied by adhesion to any other surface, at a temperature sufficient to gelatinize the ungelatinized starch particles, thereby producing a dry film which is non-blocking and capable of becoming tacky and adhesive when remoistened.

2. The method of claim 1 in which the suspension of ungelatinized starch particles has a viscosity of at least 5,000 centipoises when heated for 15 minutes at 190° F.

3. The method of claim 1 in which the starch is selected from the class consisting of sago, potato, waxy maize and tapioca starches.

4. The method of claim 1 in which the aqueous suspension of ungelatinized starch particles contains dispersed therein a gelatinized starch, the amounts of such gelatinized starch being minor relative to the ungelatinized starch.

5. A method for making gummed surfaces which may be activated to a tacky, adhesive state upon being remoistened with water, which comprises coating upon a paper substrate an aqueous suspension of ungelatinized starch particles, said suspension containing at least 30% by weight of starch, dry basis, and having a pH of at least 4, said suspension containing from 5% to 100%, based on the dry weight of the starch in said suspension, of a substance selected from the class consisting of peptizers and humectants, and then drying the coating, unaccompanied by adhesion to any other surface, at a temperature sufficient to gelatinize the ungelatinized starch particles, thereby producing a dry film which is clear, non-blocking and capable of becoming tacky and adhesive when remoistened.

6. The method of claim 5 in which the aqueous suspension of ungelatinized starch particles contains dispersed therein a gelatinized starch, the amount of such gelatinized starch being minor relative to the ungelatinized starch.

7. The method of claim 5 in which the peptizer is selected from the class consisting of the water soluble amides, the thiocyanates, the alkali metal and alkaline earth hydroxides, the water soluble inorganic nitrates and chlorides, formic acid and chloral.

8. The method of claim 5 in which the humectant is a polyol.

References Cited by the Examiner

UNITED STATES PATENTS

| | | | |
|---|---|---|---|
| 887,683 | 5/08 | Miller | 117—165 X |
| 1,733,524 | 10/29 | Bradner | 117—156 |
| 1,911,400 | 5/33 | Schulte | 117—156 X |
| 2,144,610 | 1/39 | Bauer et al. | 117—156 X |
| 2,188,329 | 1/40 | Bauer et al. | 117—156 X |
| 2,463,148 | 3/49 | Caesar et al. | |
| 2,477,344 | 7/49 | Neumann | 117—156 X |
| 2,768,096 | 10/56 | Toulmin | 117—156 X |
| 2,791,512 | 5/57 | Hatch et al. | 117—122 |
| 2,793,966 | 5/57 | Davis | 117—156 X |
| 2,808,381 | 10/57 | Stone | 117—156 X |
| 2,976,178 | 3/61 | Pahl et al. | 117—156 X |
| 3,017,294 | 1/62 | Meisel | 117—165 X |
| 3,062,810 | 11/62 | Hjermstad et al. | 117—156 X |
| 3,071,485 | 1/63 | Wurzburg et al. | 117—156 X |
| 3,071,573 | 1/63 | Taylor | 117—156 X |
| 3,081,184 | 3/63 | Mosher et al. | 117—156 X |

WILLIAM D. MARTIN, *Primary Examiner.*

MURRAY KATZ, *Examiner.*